United States Patent [19]

Bowen et al.

[11] Patent Number: 5,436,898
[45] Date of Patent: Jul. 25, 1995

[54] MULTI-MEDIA NETWORK BUS

[75] Inventors: Ronald A. Bowen, Sterling; Jon Hauris; Dennis M. Kalajainen, both of Manassas, all of Va.

[73] Assignee: International Business Machines Corporation, Armonk, N.Y.

[21] Appl. No.: 958,415

[22] Filed: Oct. 8, 1992

[51] Int. Cl.$^6$ ............................ H04J 3/12; H04L 5/22
[52] U.S. Cl. .................................. 370/79; 370/85.1; 370/110.1
[58] Field of Search .................. 370/60, 60.1, 85.4, 370/85.5, 85.7, 85.8, 92, 94.1, 94.2, 95.1, 95.2, 79, 85.1, 85.9, 85.11, 110.1; 340/825.05, 825.06, 825.07, 825.08

[56] References Cited

U.S. PATENT DOCUMENTS

| | | | |
|---|---|---|---|
| 4,698,802 | 10/1987 | Goke et al. | 370/60 |
| 4,731,785 | 3/1988 | Ferenc et al. | 370/60 |
| 4,761,781 | 8/1988 | Calvignac et al. | 370/94.1 |
| 4,862,451 | 8/1989 | Closs et al. | 370/60 |
| 4,951,281 | 8/1990 | Muto et al. | 370/95.2 |
| 4,955,019 | 9/1990 | Mizuhara et al. | 370/85.7 |
| 5,107,492 | 4/1992 | Roux et al. | 370/94.2 X |

FOREIGN PATENT DOCUMENTS

| | | |
|---|---|---|
| 0115658 | 8/1984 | European Pat. Off. . |
| 0227852 | 7/1987 | European Pat. Off. . |
| 0258514 | 3/1988 | European Pat. Off. . |

OTHER PUBLICATIONS

IEEE 1986 Region 5 Conference, Apr. 1986, New York; pp. 117–122; Jagan P. Agrawal, 'A New Protocol for the Integration of Voice and Data in Local Area Networks', p. 118, right col., line 47; p. 119, left col., line 47; figure 3.
SBT/IEEE International Telecommunications Symposium, Sep. 1990, New York, pp. 127–131; D. A. Harle et al., 'Architecture and Performance of a Distributed Mixed Voice/Data Switching System with Variable Bit–Rate Lines', line 11, paragraph 3; line 15, paragraph 3; figure 4.

*Primary Examiner*—Melvin Marcelo
*Attorney, Agent, or Firm*—Lauren C. Bruzzone; Kenneth A. Seaman

[57] ABSTRACT

A multi-media network bus (MMN-Bus) and Controller (MMNC) serve as a distribution medium between a single high-speed network and multiple user network interfaces (UNIs). The MMNC allocates multiple isochronous channels and packet channels for distribution to the users over the MMN-Bus. The MMNC sends information in standard time segments or master cycles. Following transmission of a start signal, a series of control blocks is sent. The first type of control block is used for communication from the MMNC to each UNI. The second type of control block is used for transmissions from each UNI to the MMNC. Both types of control blocks are used for call setup, call acknowledgement, channel allocation, call end and packet data request. Following transmission of both sets of control blocks, a signal is sent to indicate the beginning of a sequence of isochronous transfers. Each UNI tracks the number of signals, identifying those signals which it should either receive or transmit. Following the end of the isochronous channel transmissions, two things occur. First, the MMNC sends the address either of itself or the address of a UNI. (This address is sent continuously until the end of the transmission of the related packet.) Subsequently, a start packet signal is sent which indicates the beginning of the packet transmission by the unit whose address was sent. Each packet contains a destination address. Each UNI and the MMNC check the destination address against their own address: if it matches, the device receives the packet. An end packet signal indicates the end of the transmission of the first packet.

14 Claims, 15 Drawing Sheets

FIG. 14

802.3 PACKET FORMAT

| PREAMBLE | SFP | DEST | SOURCE | LENGTH | DATA | FCS |
|---|---|---|---|---|---|---|
| 62 BITS | 2 BITS | 6 BYTES | 6 BYTES | 2 BYTES | >46 BYTES | 4 BYTES |

MMN-Bus PACKET FORMAT

| DEST | SOURCE | LENGTH | DATA |
|---|---|---|---|
| 6 BYTES | 6 BYTES | 2 BYTES | >46 BYTES |

MULTI-MEDIA NETWORK BUS

FIELD OF THE INVENTION

This invention relates to the area of transmitting different types of data between a high speed network and a plurality of local area networks. More specifically, the invention relates to a method and apparatus designed for use in multi-media applications requiring a varying mix of isochronous data and packet data transfers.

PRIOR ART

The past decades have seen a continuously growing corporate demand for fast, reliable information transfer. Initially, communications were "mono-media," that is, they used only one type of data. Typical examples of such applications are voice transmission own a phone line and data transmission to a terminal. As technology improved, 100 Mbit/s range high speed networks (such as FDDI, DQDB and B-ISDN) were developed. Such networks could support the transmission of considerably more information than previously possible. Such technology enabled, and fed the demand for, multimedia communications which integrated different types of data. A generic example of such multimedia communications would be a video-conference between several people ,at different locations, where graphics or data was simultaneous displayed on terminals. In this type of application, multiple parties can see and talk to each other, as well as having access to the charts and documents under discussion.

To implement a multimedia application, moving image, voice and data must be transmitted simultaneously. To do this in a cost effective manner presents some difficulty since each type of data has different traffic characteristics and requirements. For example, real-time, isochronous information (such as moving images and voice) requires a controlled delay time limit. That is, such data must be considered high priority and guaranteed network bandwidth to insure a consistent and constant communication channel. In contrast, Asynchronous data (such as graphics or documents) can tolerate fluctuating delay times and can be sent in packet format. Essentially, this lower priority data not require a constant channel. However, care must be taken to insure some channel resources are assigned to asynchronous transmission, in order to avoid the such data being totally shut out by the higher priority isochronous transmissions.

The initial developments in multimedia applications were directed towards creating an efficient means of transmitting a multimedia mix of data over high speed networks. Obviously, separate, independently operating, transmission facilities could be used for each type of data. However, this method would raise both the problem of cost (due to duplicated facilities) and synchronization. Accordingly, schemes were developed simultaneously multiplex mixed data over one or more channels. The simplest method is, of course, a fixed time slot arrangement: each of the different types of data being assigned a fixed amount of the transmission resources. This solution proved flawed, however, in that it makes no provision for differing delay time requirements of the varying types of information. In addition, a fixed assignment could result in the band used for isochronous data being underutilized, while the packet data band could be operating at 100% utilization, with a backlog of data. In addition, a fixed assignment would not be able to provide for varying numbers of isochronous channels. Various allocation schemes were developed to provide effective use of resources without sacrificing traffic requirements. An example of such a scheme can be found in Tzung-Pao Lin's paper, "Performance Characterization For a Dual-Channel Multimedia Multiplexor", 1990 IEEE Region 10 Conference on Computer and Communications Systems, Sep. 24-27, 1990, Conference Proceedings, Volume 2, page 667.

The same problems which plague high speed network resource allocation are also of concern when the data must be successfully transmitted from the high speed network to a user-interface. U.S. Pat. No. 4,698,802, "Combined Circuit and Packet Switching System", by Goke, et al., (herein referred to as Goke) provides one solution for this facet of the overall problem. That patent discloses a bus which can be used for transmission between a high speed network and a single user. Goke uses a time slot scheme in which the packet data is assigned a certain minimum number of time slots. Thus, packet data is never totally blocked. Further, Goke's scheme is dynamic in that it permits packet traffic to use all time slots not currently being used by isochronous traffic. However, Goke's scheme does not provide for multiple isochronous channels.

To enable truly efficient multimedia communication, however, two additional factors should be considered. First, the transmission facilities required by high speed networks are often expensive and have certain difficulties in installation. (For example, fiber optic networks present unique challenges in splicing cables and in laying such cables in non-linear paths.) In contrast, local area networks typically use twisted pair lines which are easy to both install and splice. Accordingly, the most effective communication network would require a means of bi-directional data traffic between a high speed network and multiple local area networks. Secondly, if users on adjacent LANs could communicate with each other, without requiring use of the (expensive) high speed network, then this would reduce the load on the high speed network resources.

OBJECTS OF THE INVENTION

It is accordingly an object of this invention to provide a method and apparatus that provide for efficient transmission of isochronous and packet data between a high speed communication network and a plurality of users.

It is a further object of this invention that such transmission provide for the varying traffic characteristics of isochronous and packet data and still use the transmission facilities efficiently.

It is a further object of this invention to provide an effective multi-media bus architecture by providing for dynamic allocation of variable isochronous and packet bandwidth and variable numbers of isochronous channels.

It is a further object of this invention to provide cost-effective communication between high speed networks and local area networks.

It is a further object of this invention that the method and apparatus also provide for effective communication between the users connected to the apparatus, without requiring use of the high speed communication network.

SUMMARY OF THE INVENTION

The present invention overcomes the above described problems and deficiencies of the prior art and achieves technological advance by providing an improved multimedia bus and control protocol, for transmitting isochronous and packet data between a backbone or wide area network and multiple local area network users.

The invention comprises a multi-media network bus (MMN-Bus) and Controller (MMNC) which serves as a distribution medium between a single high-speed network and multiple user network interfaces (UNIs). The MMNC allocates multiple isochronous channels and packet channels for distribution to the users over the MMN-Bus.

In the present invention, the MMNC sends information in standard time segments or master cycles. Each master cycle is initiated by a start signal. Following the start signal, a series of control blocks is sent. The first type of control block is used for communication from the MMNC to each UNI. There is one block of such control block sent for each UNI connected to the MMN-Bus. The second type of control block is used for transmissions from each UNI to the MMNC. Again, one block of such control data is sent for each UNI connected to the MMN-Bus. Both types of control blocks are used for call setup, call acknowledgement, channel allocation and call end.

Following transmission of both sets of control blocks, a signal is sent to indicate the beginning of a sequence of isochronous transfers. Each UNI tracks the number of transfers, identifying those transfers which it should either receive or transmit.

Following the end of the isochronous channel transmissions, two things occur. First, the MMNC sends the address either of itself or the address of a UNI. (This address is sent continuously until the end of the transmission of the related packet.) Subsequently, a start packet signal is sent which indicates the beginning of the packet transmission by the unit whose address Was sent. Each packet contains a destination address. Each UNI and the MMNC check the destination address against their own address: if it matches, the device receives the packet. An end packet signal indicates the end of the transmission of the first packet.

If subsequent packet transmissions are pending, the procedure outlined in the preceding paragraph is repeated. If, however, there is not sufficient time left on the master cycle to complete the packet transfer, the MMNC suspends the transfer, sending the suspend signal. This suspend signal continues to be sent through the next cycle until the completion of the isochronous channel transfers. The address signals are also sent continuously during the control data and isochronous channel transfers. At the end of the isochronous transmissions, the MMNC deserts, that is, ceases sending the suspend signal and sends a start packet signal. The packet data transmission then starts, picking up at the point at which it Was suspended. (That is, the header, destination address, source address and length fields will not be retransmitted, if they were previously transmitted.)

It will be noted that the MMN-Bus provides isochronous channels to guarantee that appropriate bandwidth is dedicated to video, voice and other types of isochronous data. The isochronous channels are given priority on the bus over any packet transfers. In addition, this invention can provide for transmission of any number (and, in fact, a varying number) of isochronous channels. Similarly, the suspend feature guarantees the required bandwidth for isochronous channels because it prevents blocking of isochronous traffic by packet traffic and permits allocation of different isochronous channels and bandwidth as required.

BRIEF DESCRIPTION OF THE DRAWINGS

FIGS. 13–16 are representations of the MMN-Bus timing. FIG. 13 is a continuation of FIG. 3. FIG. 15 is a continuation of FIG. 13. FIG. 16 is an alternate continuation of FIG. 13. These diagrams illustrate all the interactions between the signal lines of the MMN-Bus.

DETAILED DESCRIPTION OF THE INVENTION

Figure 1:
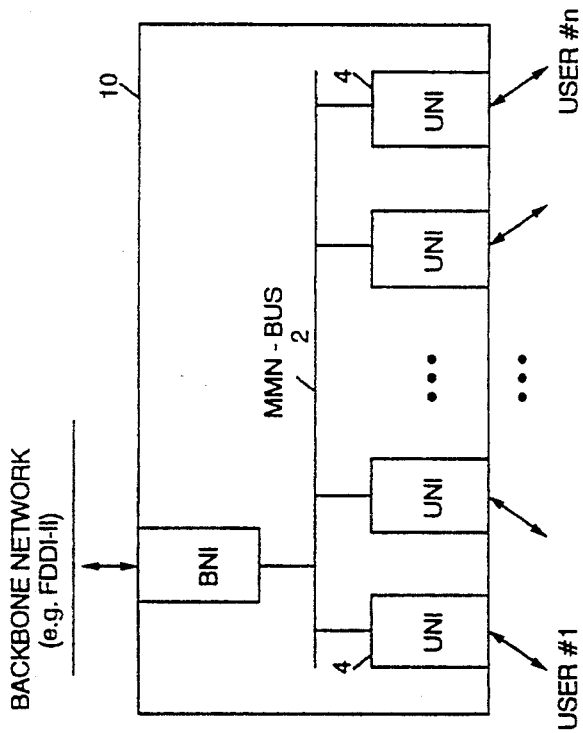
FIG. 1 is a block diagram of a multimedia system including the MMN-Bus.

FIG. 1 illustrates an apparatus to distribute high-speed isochronous and packet data to a set of users over multiple user network interfaces (UNIs). The Multi-Media Network Bus (MMN-Bus) shown in FIG. 1 serves as a distribution medium between a single high-speed network and multiple UNIs. In addition, the MMN-Bus can provide local communication services to the local users. Such local communications, or LAN-type services, are provided on the MMN-Bus independent of the backbone network. Local Communications permit UNIs that are associated with a single MMN-Bus to communicate with each other. Simultaneously, remote communications occur over the MMN-Bus, through the backbone network interface, and across the network to the receiving backbone network interface.

On the backbone network, there may be multiple isochronous channels of varying bandwidth. Each channel must be guaranteed adequate bandwidth to continue transmission without interruption. This is accomplished by operating the network on a master cycle basis where each channel had dedicated to it a certain amount of the available bandwidth within that cycle. Any remaining bandwidth within the master cycle of the backbone network can be used as a packet data channel. The MMN-Bus Controller (MMNC), resident on the backbone network interface (BNI), allocates multiple isochronous channels and the packet channel for distribution to the users over the MMN-Bus. The MMNC performs this allocation for both local and remote communications.

The apparatus and method will be described with relation to a 100 Mbps Fiber Distributed Data Interface (FDDI)-II backbone network and a 64–100 Mpbs Ethernet UNIS. (The FDDI defines a LAN using a fiber optic transmission medium. The extended version of FDDI (FDDI-II) provides packet oriented services and an additional connection oriented service). The band width of an FDDI-II ring can be subdivided in up to 16 wideband channels for the connection oriented service, each channel having a capacity of 6.144 Mbit/s each. A fixed frame structure is used for that purpose. Every 125 microseconds a new frame is inserted by a station called a bus master. As will be known by those skilled in the art, a clock pulse is sent over the line in order to synchronize transfers.

Figure 2:
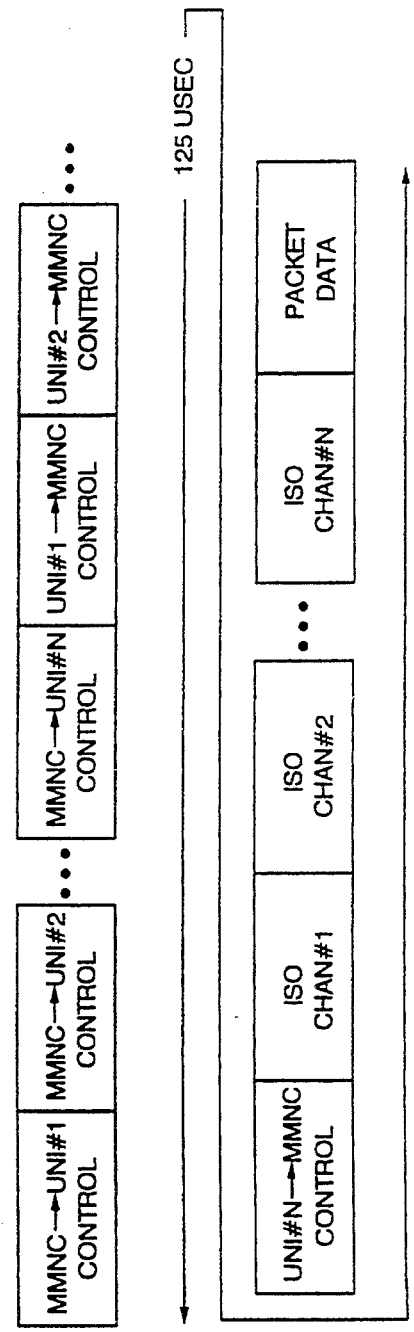
FIG. 2 is a representation of the MMN-Bus Master Cycle.
Figure 3:
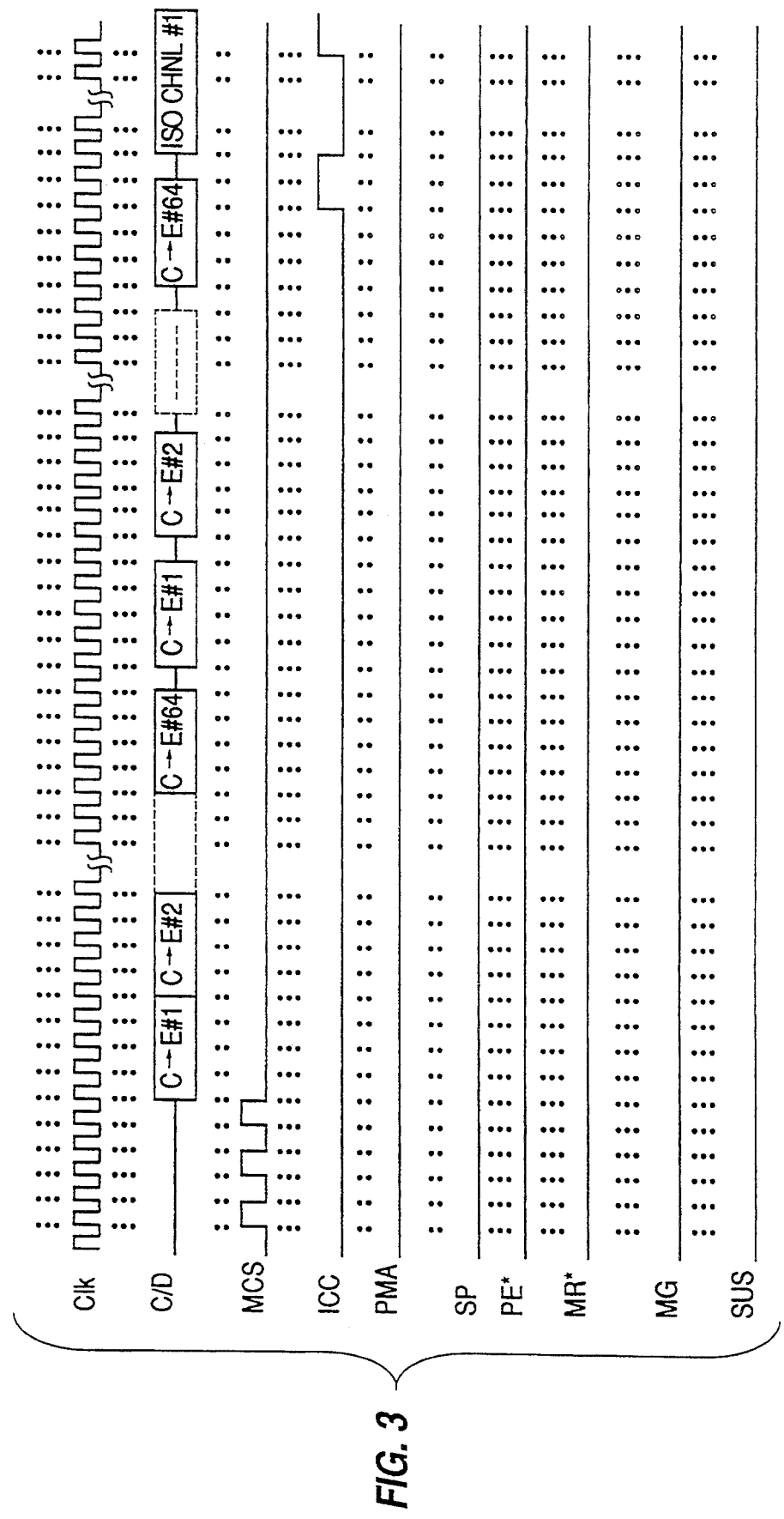
FIG. 3 is a representation of the MMN-Bus timing.

FIG. 1 shows the MMN-Bus (2), the BNI (Backbone Network Interface on which is resident the MMNC) (8) and multiple UNIs 4. The MMN-Bus, in the preferred embodiment, operates on the same master cycle as the FDDI-II network, 125 microseconds. FIG. 2 illustrates the master cycle. Referring to FIG. 2, the master cycle is divided into n MMNC→UNI control bands, (one for each UNI active on the MMN-Bus where n is between 1 and 64), n isochronous channel bands (one for each of the isochronous channels required by the transmission), and a band for Packet Data.

The following consists of a more detailed description of the operations of a given master cycle include:

1. The beginning of the master cycle is indicated by a Master_Cycle_Start, that is, by three pulses on the MCS signal (FIG. 3, 300,310 and 320).

Figure 4:
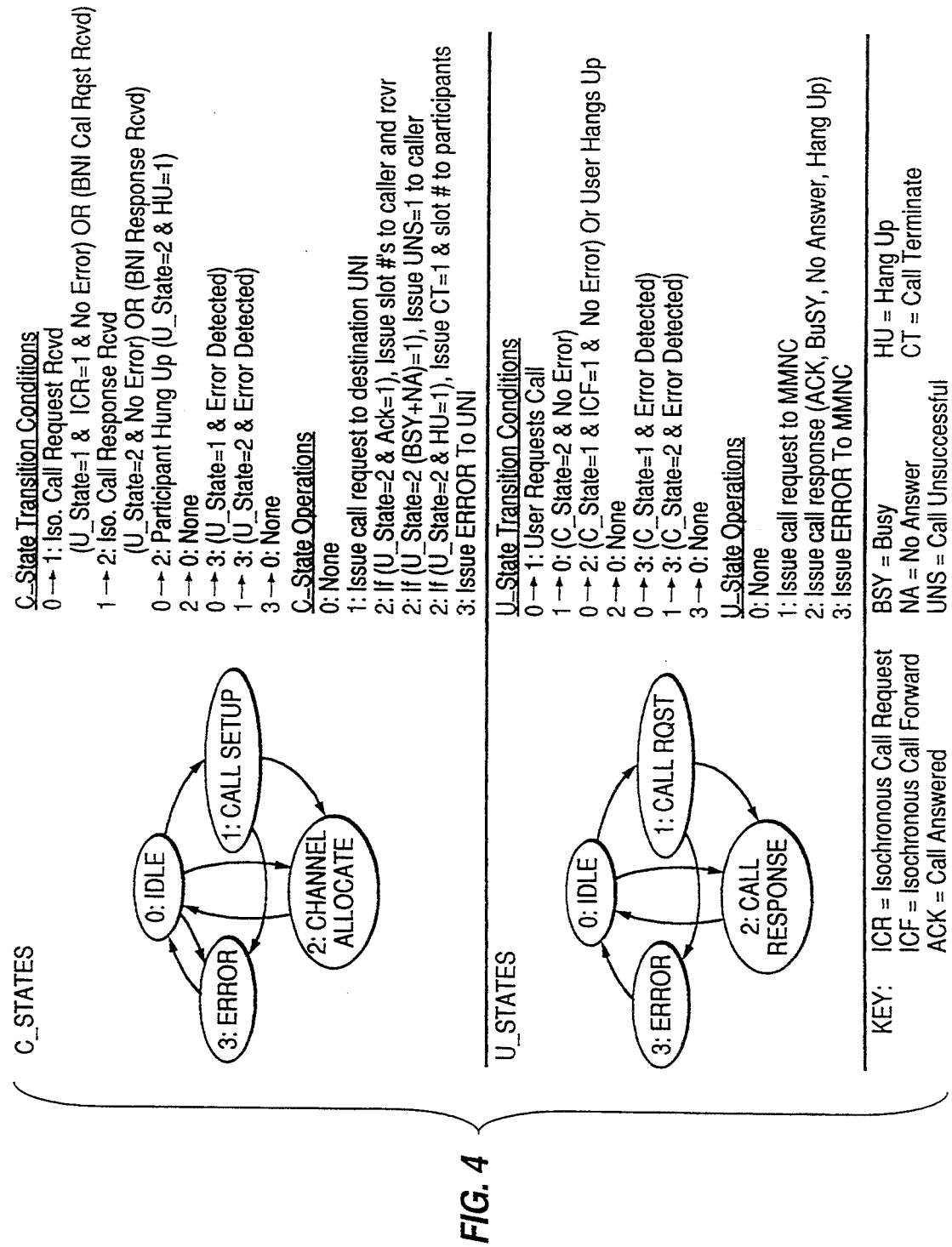
FIG. 4 is a representation of the C_State and U_states and their interrelations.

At the completion of the third pulse on MCS, the MMNC begins asserting the C/D bus with control data for the UNIs. Following the transmission of the MMNC-to-UNI control data, each UNI sends control data to the MMNC. The function of these two control operations are governed by two states, the C_State (the MMNC state) and the U_State (the UNI state). The purpose of the control states and the associated control data transfers is call setup, call acknowledgement, channel allocation, call end and packet data request (to transmit or receive). Packet data bandwidth is requested by the UNIs. The C_State ant the U_State diagrams, and their interrelations, are shown in FIG. 4.

Figure 5:
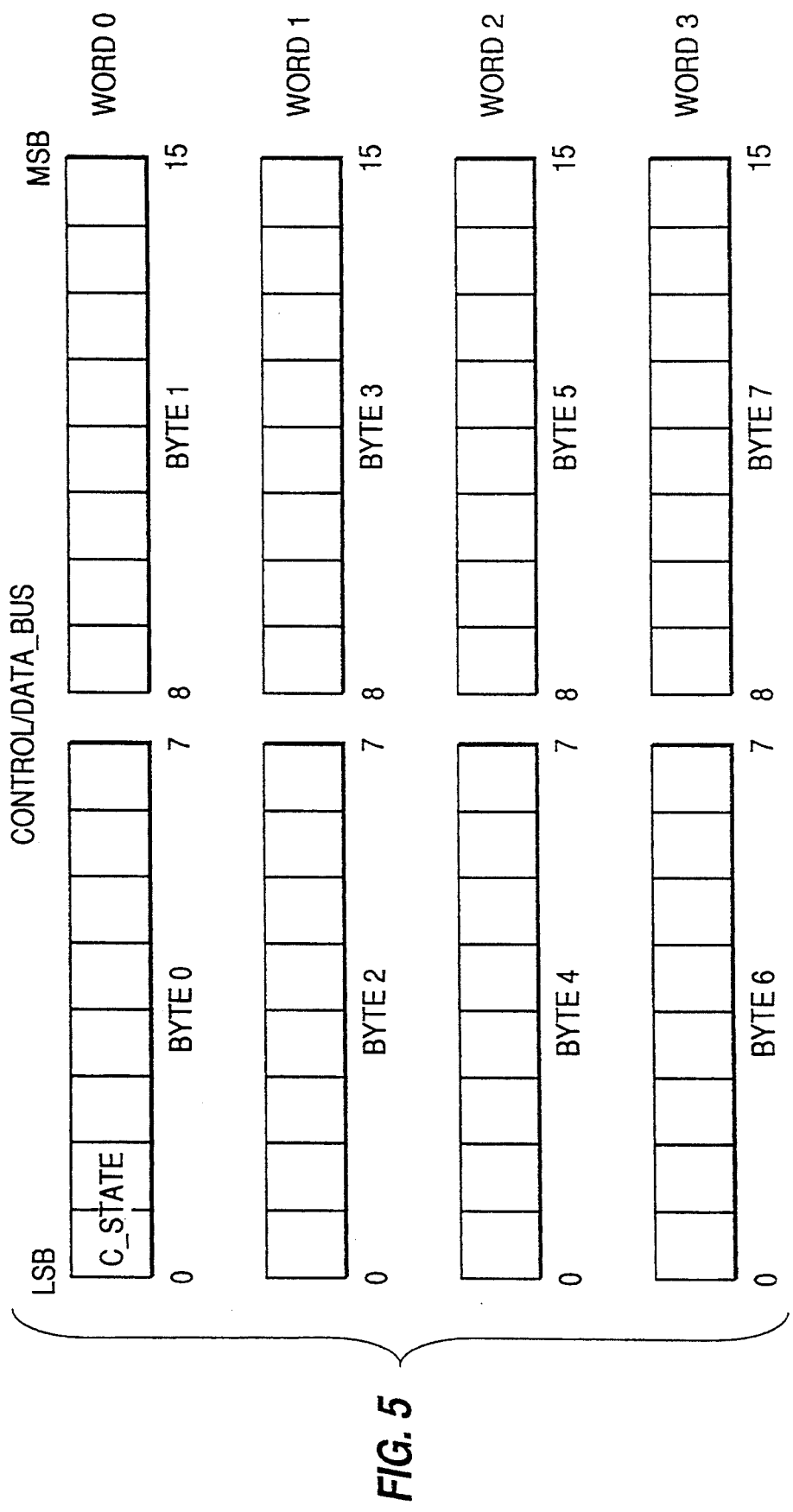
FIG.5 is a representation of the MMNC-to-UNI generic control format.

2. The transmission of control information from the MMNC to each UNI, the C_State proceeds as follows. Each UNI receives 8 bytes of control information. The 8 bytes are transmitted in four cycles. The MMNC-to-UNI generic control format is shown in FIG. 5. In Byte 0 (FIG.5, 500), the C_State defines the control state. The specific content of the control bytes are different based on the value of the C_State.

Figure 6:
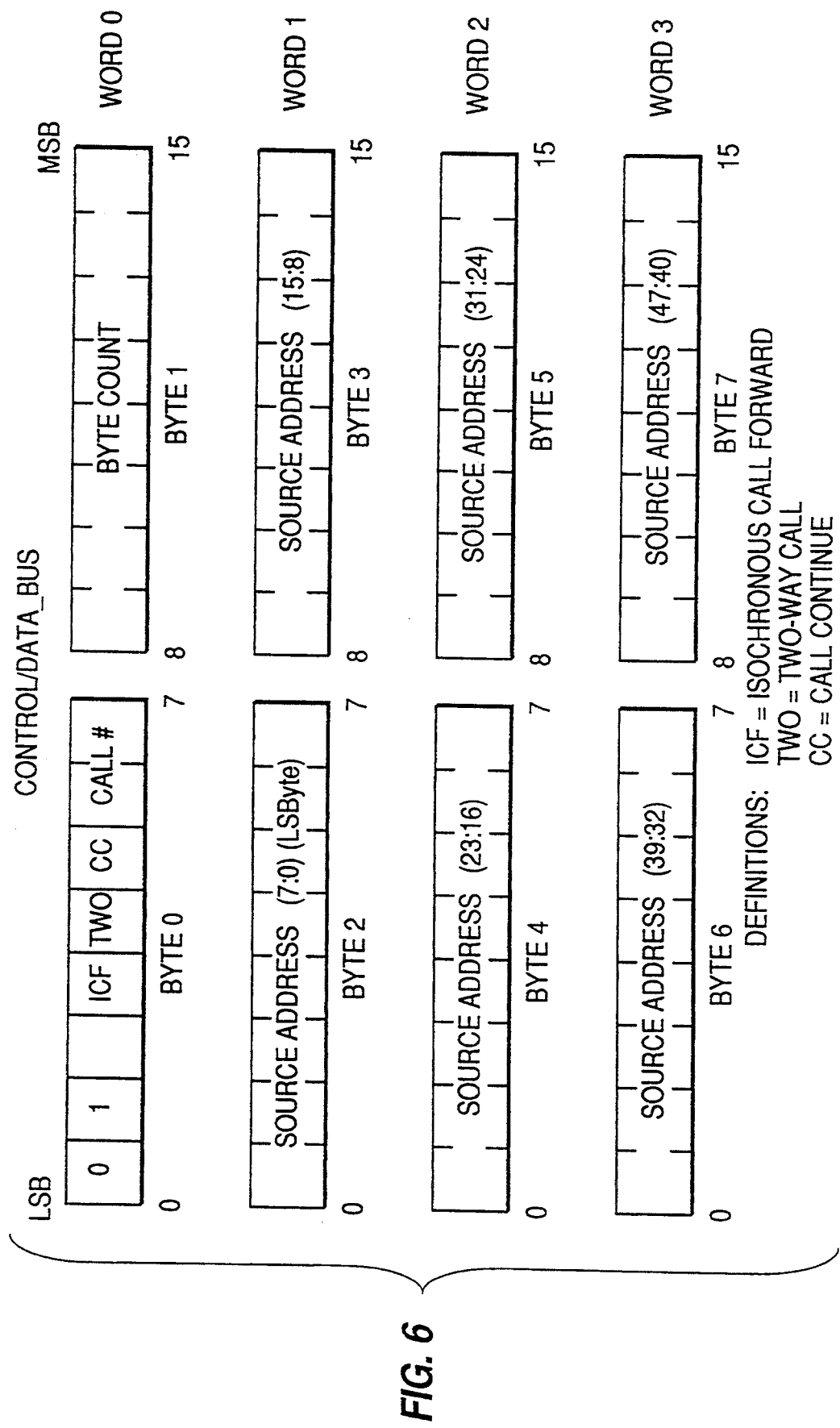
FIGS. 6–8 are representations of the control formats for various C_States.

C_State=01 is the call setup state. The MMNC establishes isochronous calls during the call setup state. FIG. 6 shows the control formats for C_State=01. The call setup begins by the MMNC issuing ICF (FIG. 6, 600) in C_State=01. The MMNC indicates to the receiving UNI if the call is a two-way call (TWO=1) or a one-way call (TWO=0), where the UNI is to receive only. (FIG. 6 610 shows the block TWO.) The MMNC also sends a Call Number (FIG. 6, 620). If the call is independent of any calls previously established between MMNC and the UNI, then CC=0. (FIG. 6, 630). If the call is linked to a previously established call, as in adding another person to a conference call, then CC=1 and the Call Number will match that of the previous call. The Byte Count (FIG. 6, 640) indicates the number of bytes per master cycle that will be transmitted to the UNI. The Source Address (FIG. 6, 650) indicates the ID of the caller who wishes to set up a call with the UNI.

Figure 7:
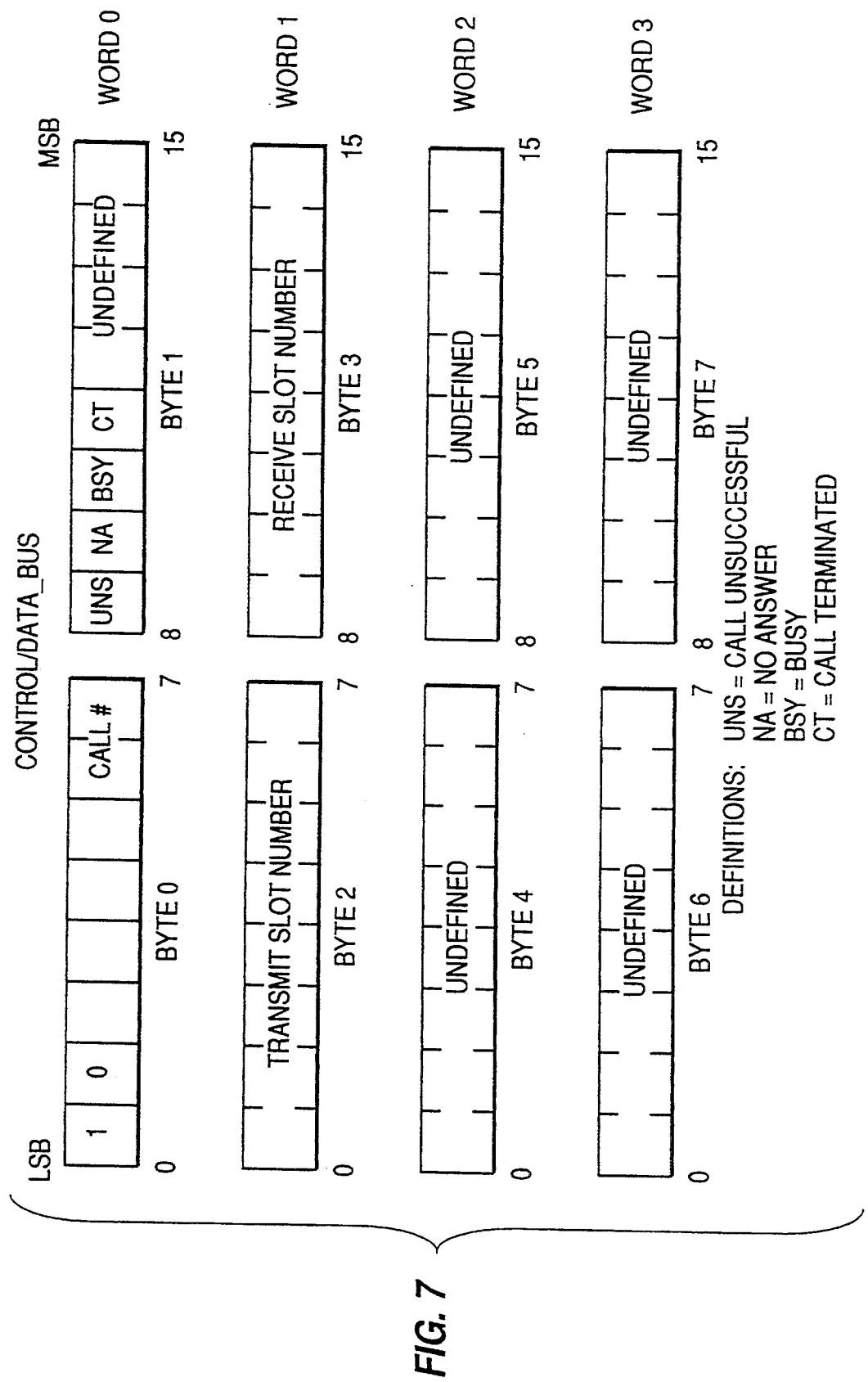

C_State=10 (FIG. 7, 700) is the channel allocation state. During this state, the MMNC assigns slot numbers to the participating UNIs who will be receiving calls. FIG. 7 shows the control formats for C_State=10.

After the call has been accepted by the UNI, the MMNC must inform both caller and receiver in what MMN-Bus slots to transmit and receive. The call is identified by number and the slot numbers are given in Bytes 2 and 3.

When a participant hangs up on a call (U_State=2 and HU=1), the MMNC issues C_State=2, CT=1, and Receive Slot Number of the terminating participant. The Call Number identifies the call being ended. The MMNC issues this message to all continuing participants in the call.

Figure 8:
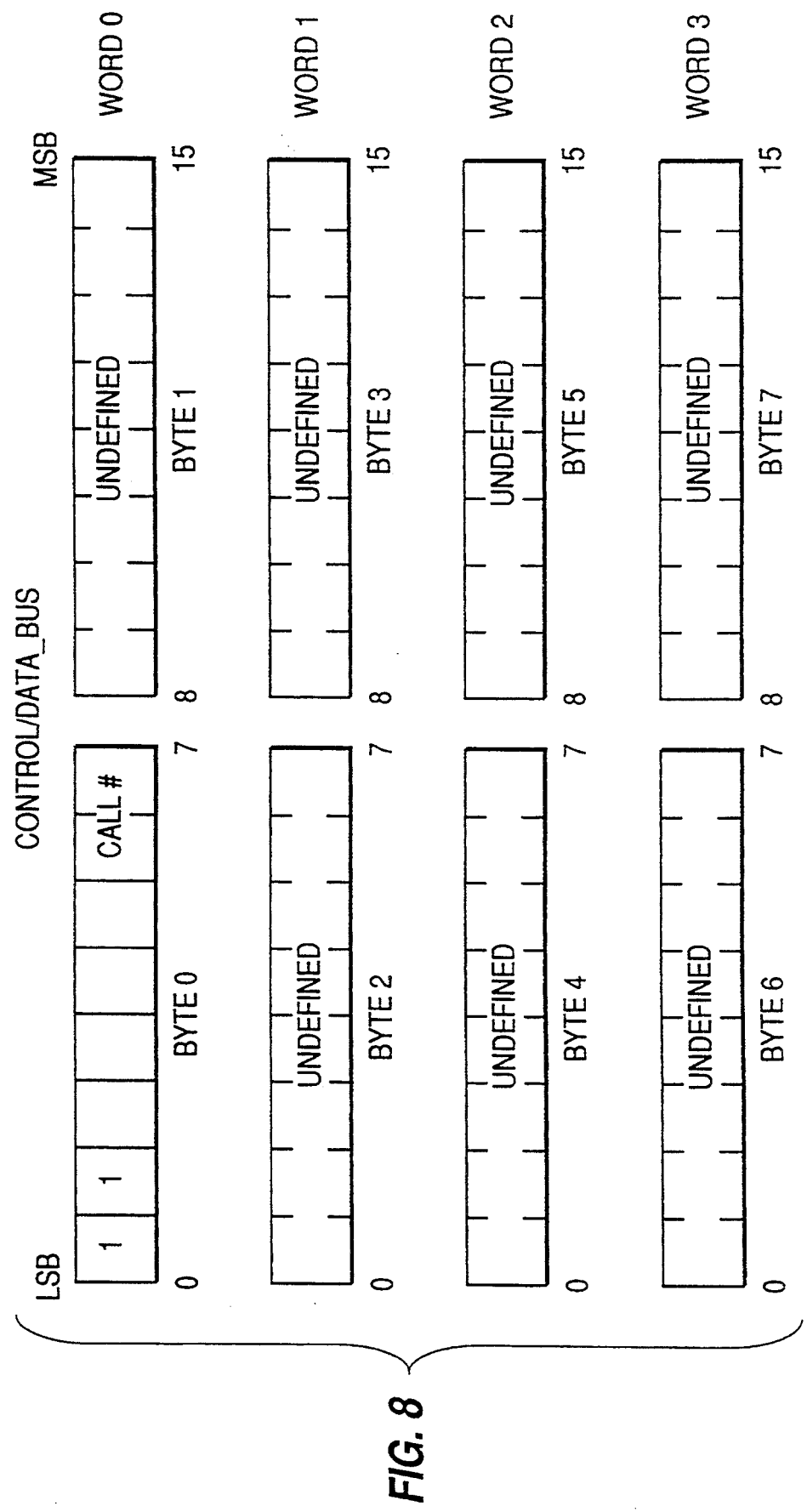

C_State=11 (FIG. 8, 800) is the error state. When the MMNC detects a parity error in the UNI-to-MMNC control field, on the next master cycle, the MMNC will assert the error state in the control field. Both the UNI and the MMNC will then transition to the idle state. C_State=00. FIG. 8 shows the control formats for C_State=11.

Figure 9:
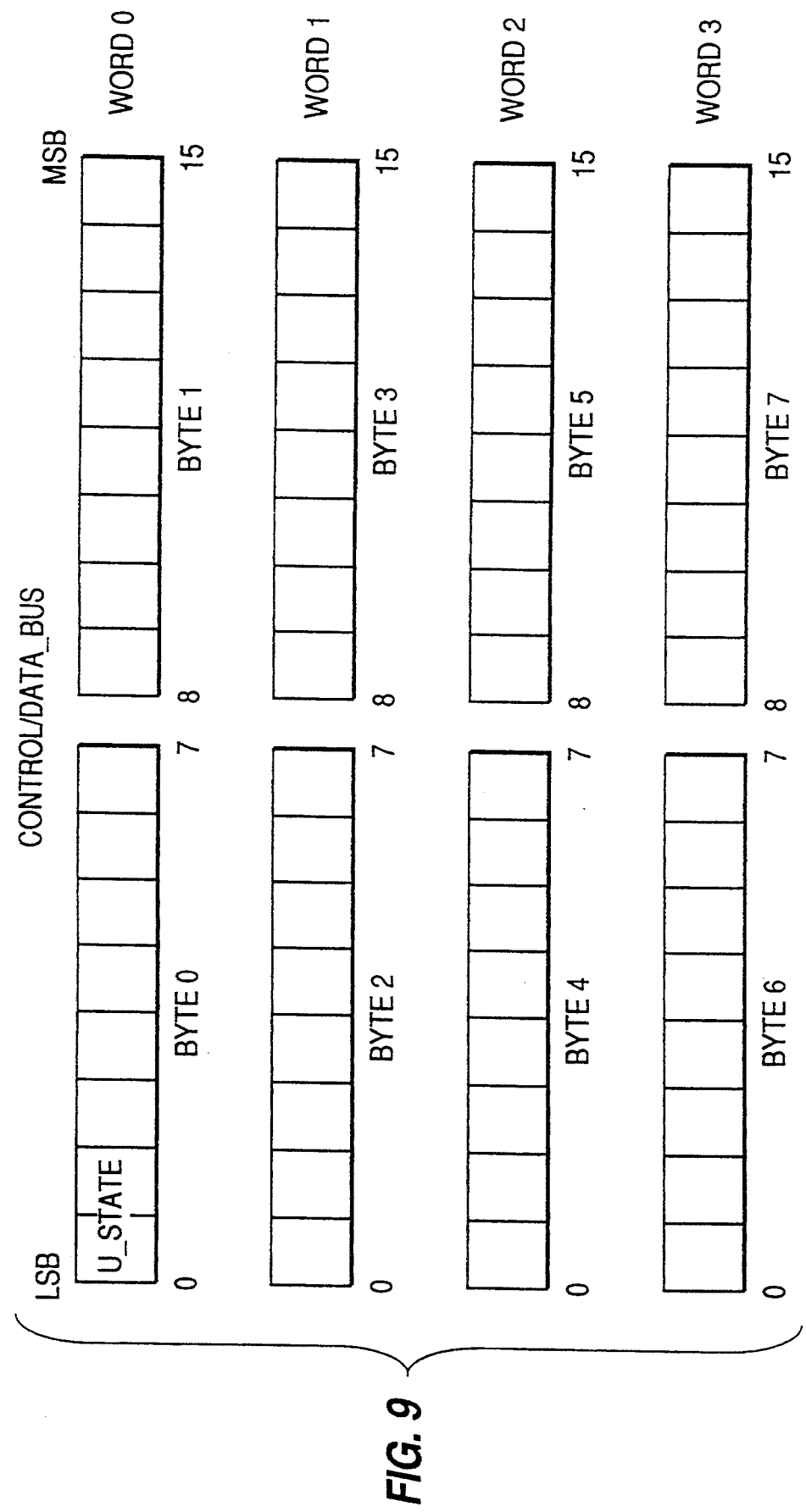
FIG. 9 is a representation of the UNI-to-MMNC generic control formats.

3. The transmission of control information from the MMNC to each UNI, the U_State proceeds as follows. At the completion of 64 MMNC-to-UNI control field transfers, each UNI transfers 8 bytes to the MMNC. The UNIs respond to isochronous channel requests, request isochronous calls, and request packet bandwidth. The 8 bytes are transmitted in four cycles. The UNI-to-MMNC generic control format is shown in FIG. 9. In Byte 0, (900 in FIG. 9), the U_State defines the control state. The specific content of the control bytes are different based on the value of the U_State.

Figure 10:
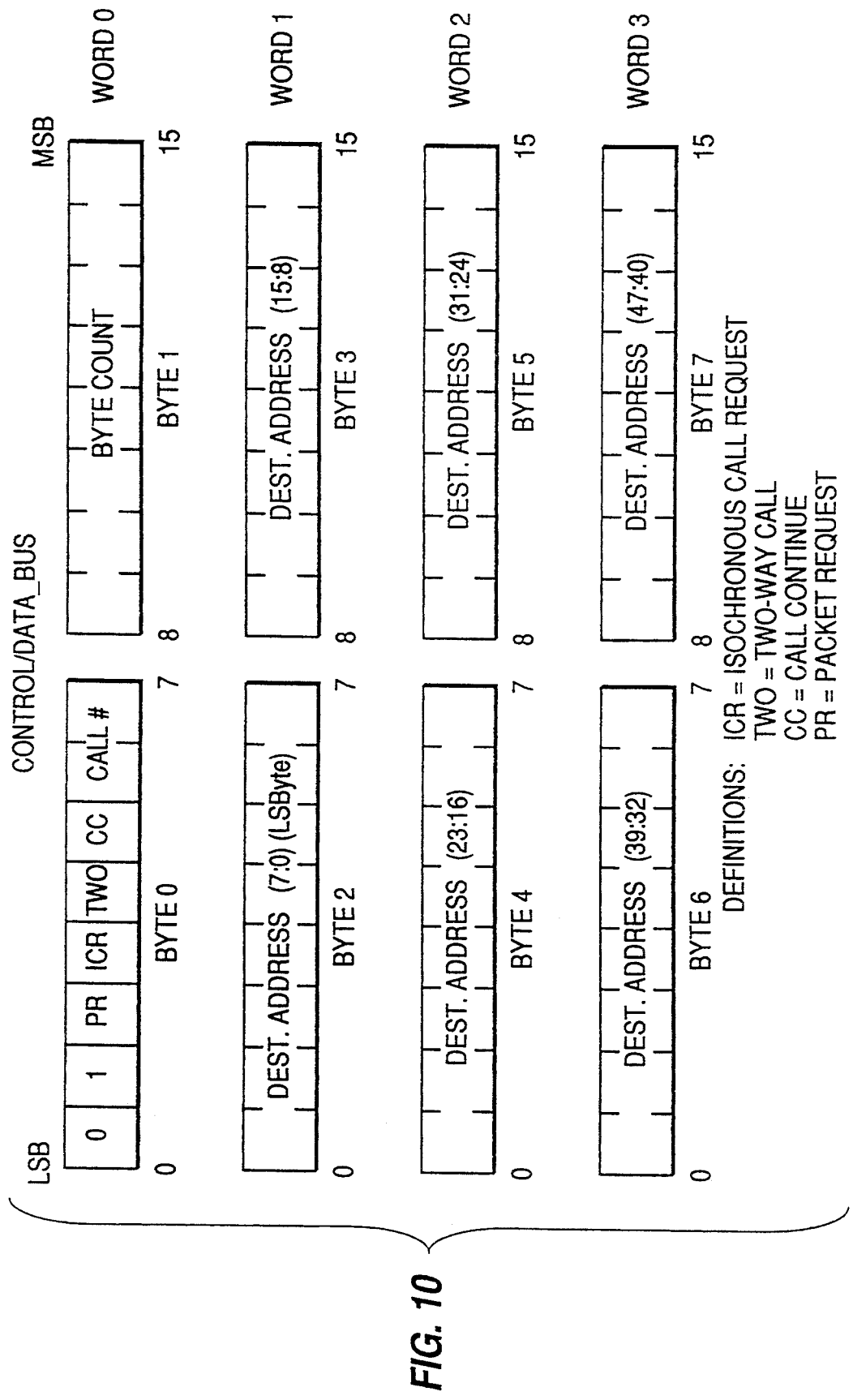
FIGS. 10–12 are representations of the control formats for various U_States.

FIG. 10 shows the control formats for U_State=01. U_State=01 (1000) is the call request state. The UNI requests bandwidth for isochronous calls during this state. The UNI may also request packet bandwidth during this state.

The call request begins by the UNI issuing ICR (1010) in U_State=01 to the MMNC. The UNI indicates the MMNC if the call is a two-way call (TWO=1) or a one-way call (TWO=0). (FIG. 10, 1020.) The UNI also sends a Call Number (1030). If the call is independent of any calls previously established between the MMNC and the UNI, then the block CC (1040) is set at 0. If the call is linked to a previously established call then CC (1040) is set at 1 and the Call Number (1030) will match that of the previous call. The Byte Count (1050) indicates the number of bytes per master cycle that will be transmitted from the requesting UNI. The Destination Address (1060) indicates the ID of the receiver.

Figure 11:
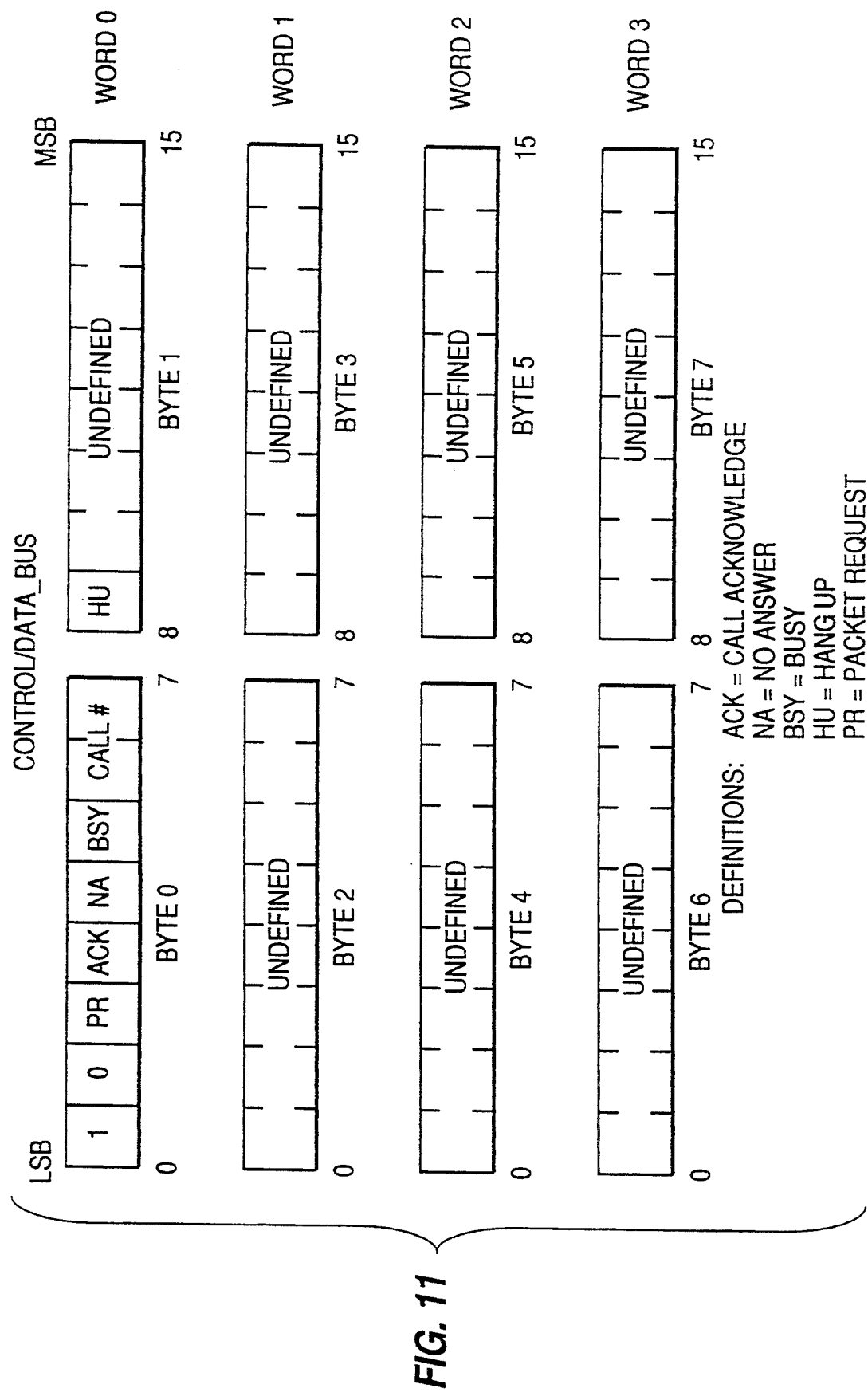

FIG. 11 shows the control formats for U_State=10. U_State=10(1100) is the call response state. The UNI responds to MMNC-to-UNI C_State=01 isochronous call setup requests in this control state. The UNI may also request packet bandwidth during the state.

After a UNI receives a C_State=01 ICF, the UNI must indicate if it will participate in the call. ACK=1 (1110) indicates that the UNI will participate. NA=1 (1120) indicates that no answer was received from the user. BSY=1 (1130) indicates that the UNI has insufficient bandwidth to support this call. The Call Number (1140) will match that of the C_State=01 Call Number.

If the UNI is already participating in a call and wants to terminate its participation, then it asserts U_State=10 and HU=1 and HU=1 to indicate that it is hanging up on the current call. The Call Number identifies what call is to be terminated.

Figure 12:
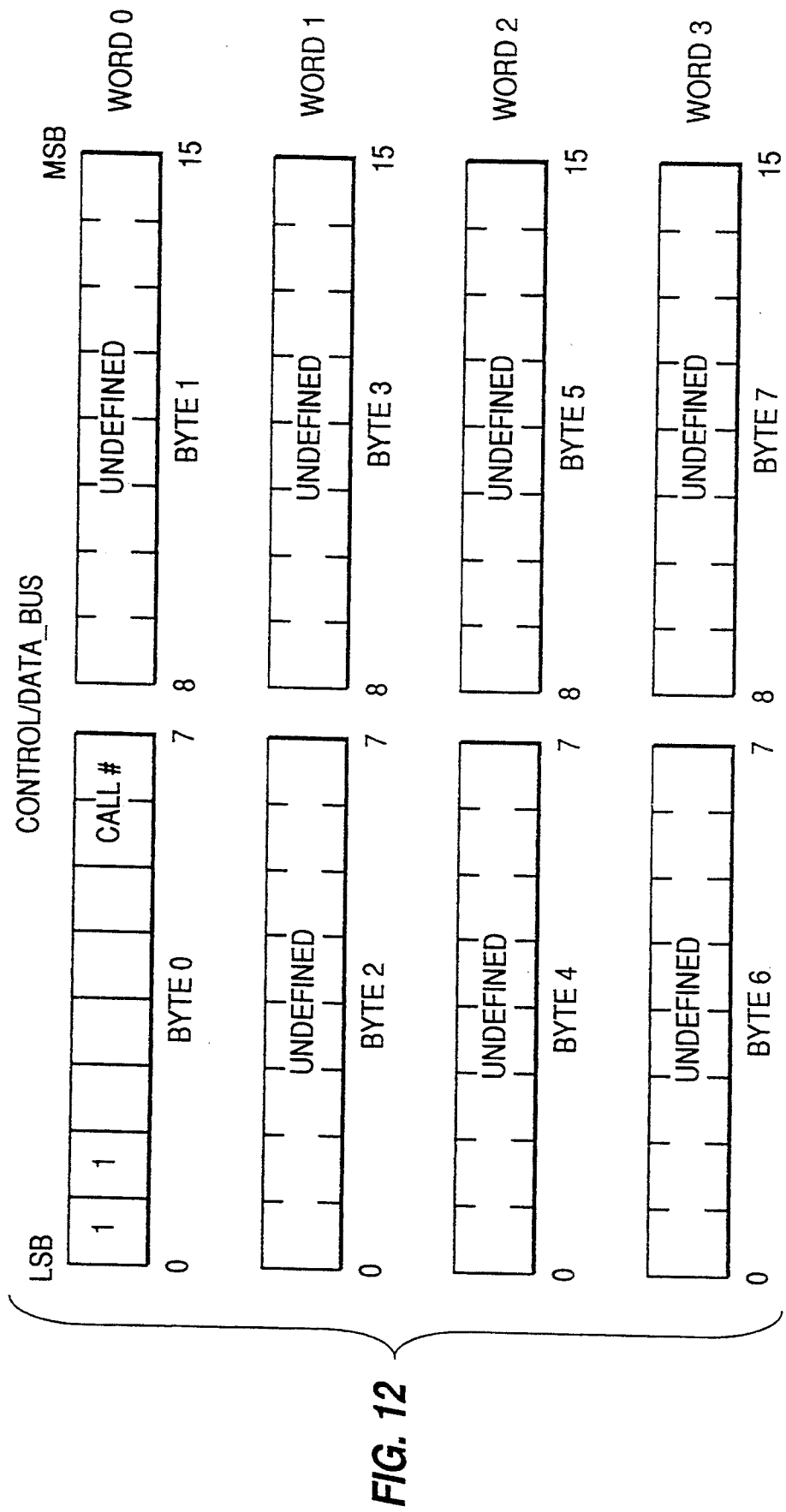

FIG. 12 shows the control formats for U_State=11. U_State=11 (1200) is the error state. When the UNI detects a parity error in the MMNC-to-UNI control field, on the next master cycle, the UNI will assert the error state in the control field. The UNI and the MMNC will then transition to the idle states, U_State=00 and C_State=00, respectively.

4. and 5. At the completion of the UNI-to-MMNC control transfers, the isochronous transfers start. The Isochronous_Channel_Count (ICC) line signals the beginning of each isochronous slot on the MMN-Bus. ICC is active high and must be active two consecutive cycles to indicate a channel slot change. Each UNI counts the number of ICC pulses to identify when to receive or transmit isochronous data. When the number of ICC pulses equals the slot number received during a C_State=2 transfer, the UNI receives or transmits the number of bytes defined by the C_State=1 transfer for receive, or the U_State transfer for transmit.

A single bus cycle separates each isochronous channel on the MMN-Bus. This insures that orthogonal drive of the signal lines does not occur.

Figure 13:
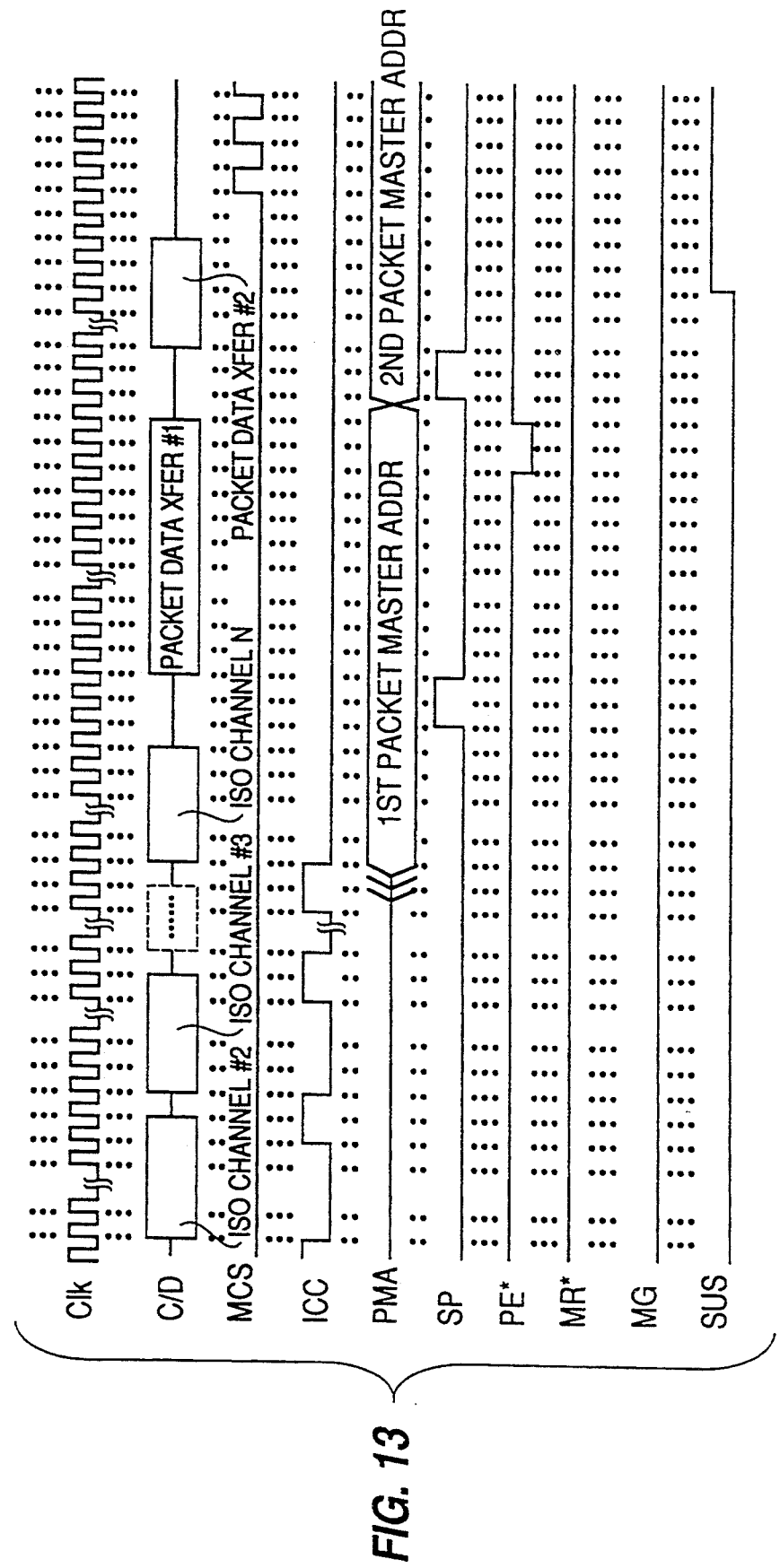

6. After the last isochronous channel, packet transfers occur. (Note that All UNIs with packet data to transmit had already requested bandwidth during the control cycle.) The MMNC prioritizes or queues the requesters and grants packet access by the priority or queuing algorithm. When the MMNC determines which UNI is granted packet access to the MMN-Bus first, it drives the Packet Master Address on the Packet_Master_Addr lines prior to the end of Isochronous channel N. (The MMNC must assert the address of a UNI, between 0 and 63, or the address of the MMNC, 64, prior to assertion of Start_Packet.) The beginning of packet transfer is designated by the assertion of Start_Packet (SP) by the MMNC. (FIG. 13, 1300). When the Start_Packet is asserted, the packet master UNI will assert data as shown in FIG. 13, 1310.

In the described embodiment of the invention, the UNIs are 10 Base IEEE 802.3 (Ethernet) interfaces. The formats of the 802.3 pack and the MMN-Bus packet are shown in FIG. 14.

Each UNI and the MMNC perform address detect on the packet. That is, they compare the data in the destination field of the packet (FIG. 14, 1400) with their own address. If the destination and the address match, the selected destination will receive the packet data. The destination can be a local UNI or a remote UNI via the FDDI-II network. In the case of packets sent by local UNIs, if the destination is another local UNI, the transmission is accomplished without requiring the use of the high speed network. The packet transfer completes when the Packet Master UNI asserts the Packet_End* line, active low (FIG. 13, 1320).

7. If additional packet bandwidth requests are pending, the MMNC drives the next Packet_Master_Addr (FIG. 13, 1330) and the Start_Packet signal (FIG. 13, 1340) to indicate a new packet transfer is beginning.

8. If the packet transfer cannot complete before the master cycle restarts, the MMNC asserts Suspend (SUS=1) (FIG. 13, 1340). The current packet master ceases transfer of packet data two cycles after SUS=1. The MMNC then starts the master cycle by pulsing the MCS line three times. THE MMNC continues to drive the suspended packet master's address on PMA. (FIG. 15, 1501).

The master cycle follows the same procedure as previously described. At the completion of the isochronous channel transfers, the MMNC will assert SP (FIG. 15, 1520) and de-assert SUS (FIG. 15, 1530). This indicates to the suspended packet master and the suspended packet receiver, that the packet data transfer is resuming. The transfer starts at the point where it was suspended. The header, destination address, source address and length fields are not retransmitted.

Figure 15:
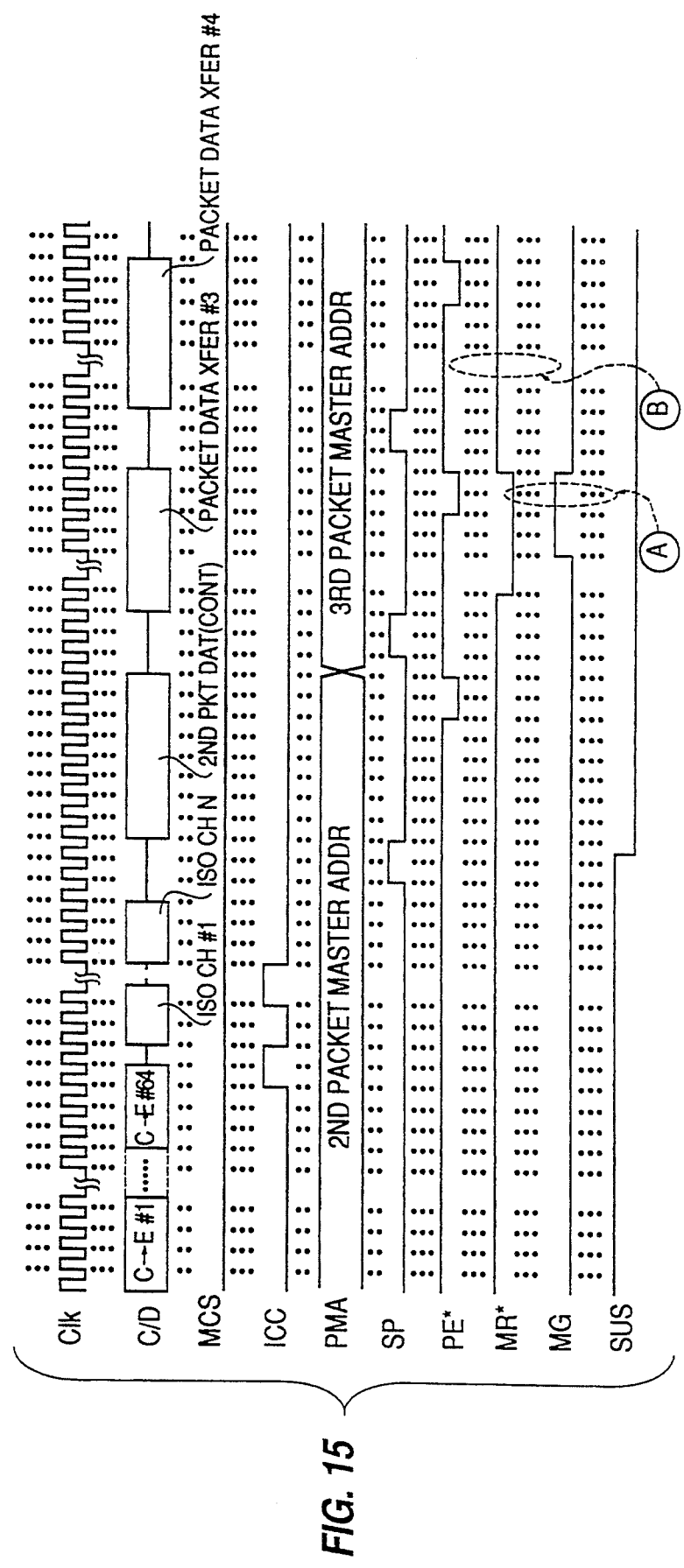

Referring to FIG. 15, the third packet master, during or at the completion of the third packet data transfer, indicates to the MMNC that additional packets are pending by asserting MR*,active low. (FIG. 15, 1540). At FIG. 15, 1550, the MMNC asserts MG=1 to grant the third packet master continued access to the bus for packet transfers. The MMNC only asserts MG=1 if no additional packet requests are pending, i.e., all requests received during the UNI-to-MMNC control transfers have been serviced and any previous ungranted MR* requests have been serviced. (Any MR* received by the MMNC is added to the queue of requests to service during that master cycle.)

Referring to FIG. 15, 1560, if the third packet master has additional packets to transfer, it should again assert MR*.

Figure 16:
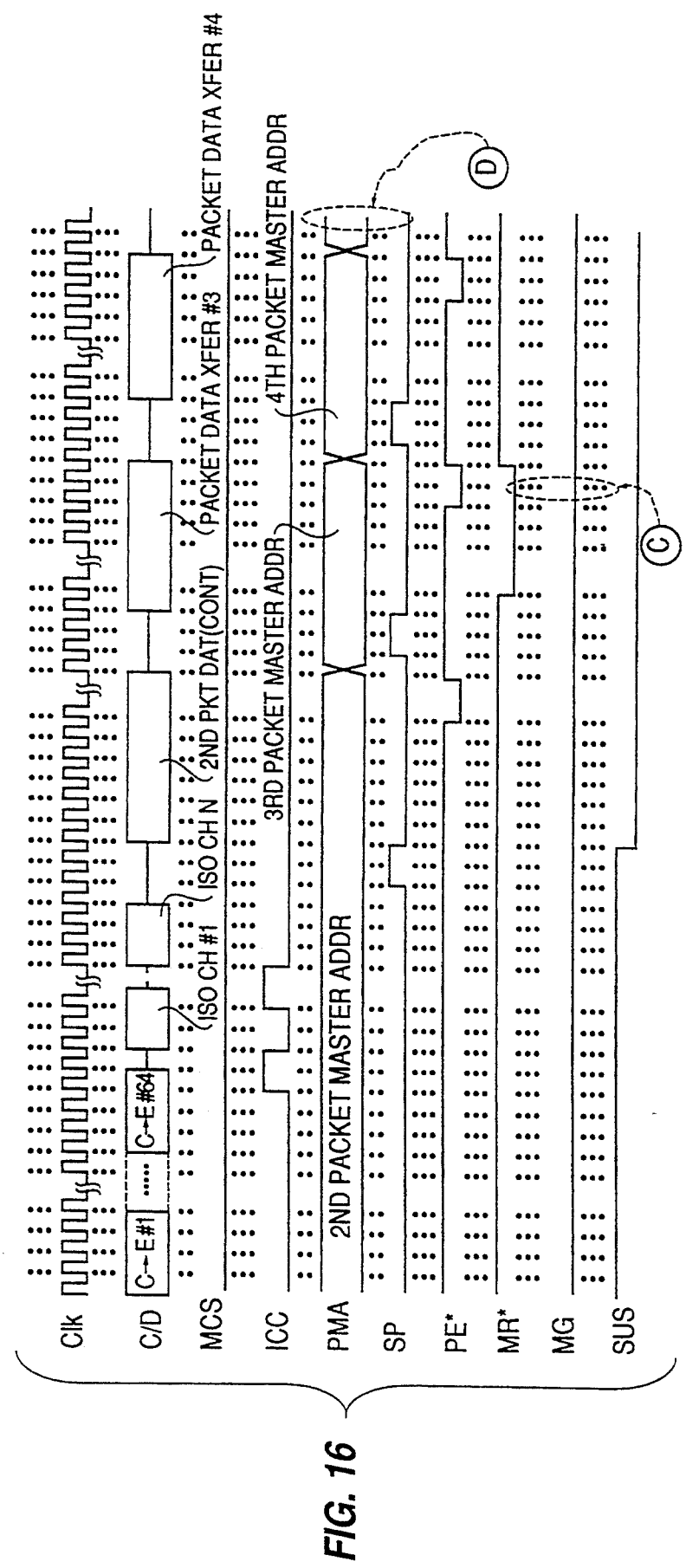

Referring to FIG. 16, 1610, the third packet master asserts MR* indicating that additional packets are pending. If the MMNC has not serviced all previously received packet requests, the MMNC will not assert MG (FIG. 16, 1610). However, the MMNC places the packet request in the queue for later service. The third packet master relinquishes control of the bus at the completion of the current packet transfer. THE MMNC then grants access to the fourth packet master. If the next request in the packet queue is the one, asserted by the third packet master when it asserted MR*, the MMNC will assert the third packet master's address is the one asserted by the third packet master when it asserted MR*, the MMNC will assert the third packet master's address (FIG. 16, 1620), and that UNI will begin its packet transfer at that point. Note that MG is not asserted. (FIG. 16, 1630).

As has been stated, the above invention provides the capability for full bandwidth utilization independent of traffic mix. If a high amount of isochronous bandwidth is required, the MMN-Bus provides sufficient bandwidth to contain all of the FDDI-II bandwidth, plus allow all the additional bandwidth for packet data transfers between local UNI connections. For the 16-bit bus, the additional bandwidth is 12 Mbps. For a 64 bit-bus, the additional bandwidth for packet bandwidth is 600 Mbps. IF little or no isochronous bandwidth is required, the MMN-Bus allows the full bandwidth to be used for packet data transfers.

It will also be noted that local transfers within the concentrator are contained entirely on the MMN-Bus without impacting the FDDI traffic. Further, the protocol translation on local transfers is minimal.

The preamble, starting delimiter and frame check sequence are stripped off by most Ethernet controller chips. Hence, little additional protocol manipulation is needed for local transfers. The BNI card will need to convert FDDI frames to Ethernet frames and vice versa.

It will also be noted that in the above implementation, no signal lines are driven active by more than one source simultaneously. As a result, wire-OR glitch problems are eliminated.

The above invention has been described with reference to an FDDI-II high speed network and an Ethernet UNI. It would be clear to one skilled in the art that other high speed networks stands such as Fiber Channel Standard, DQDB, and B-USDN may also be used in place, of FDDI-II. Alternate UNI are Token Ring and IEEE 802.9. The invention may also be used with high speed networks and UNIs with different speed than those specified.

Similarly, although the above described embodiment uses a bus with 16 D/D bits, buses with 32 or 64 S/D bits, or other configurations knows to the art may be used. Likewise, the format of the control information and the clock rates used may be varied to create alternate embodiments. As will be known to those skilled in the art, other modifications to the described embodiments may be made to the invention.

The invention may be used for such applications as training systems, video viewing, and video-teleconferencing.

Table 1 contains the MMN-Bus Signals and their applicable definitions.

| MMN-Bus Signal | MMN-Bus Signal Lines<br>Definition |
|---|---|
| Control/Data_Bus | 16 bits. The Control/Data_Bus (CD) is used for all control transfers between the MMNC and the UNIs, and for all data transfers, in isochronous and packet. |
| Control/Data_Parity | 2 bits. The Control/Data_Parity (CDP) line provide odd byte parity over the Control/Data_Bus. |
| Master_Cycle_Start | 1 bit. The Master_Cycle_Start (MCS) signals the start of each master cycle. When the backbone network is FDDI-II, the period of MCS is 125 microseconds. |
| ISO_Channel_Count | 1 bit. The ISO_Channel_Count (ICC) signal indicates the start of each isochronous channel transfer. UNIs participating in an isochronous transfer receive an isochronous channel number in the control field. These UNIs count occurrences of the ICC to determine channel numbers on the bus. |
| Packet_Master_Addr | 8 bits. The Packet_Master_Addr (PMA) is asserted by the MMNC to indicate which UNI is granted mastership of the MMN-Bus to send packet transfers. The PMA lines include 7 bits of address and 1 bit odd parity. The 7 bits of address provide the ability to select any of the 64 UNIs on the bus or the BNI for incoming packets from the FDDI ring. |
| Start_Packet | 1 bit. The Start_Packet (SP) line signals the beginning of a packet transfer. When the SP is active, the PMA is active and should be checked by the UNIs. |
| Packet_End* | 1 bit. Packet_End* (PE*) is an active low line asserted by the packet master to indicate the end of a packet transfer. |
| More_Request* | 1 bit. More_Request* (MR*) is an active low line asserted by the packet master to inform the MMNC that another packet transfer is pending at the completion of the current one. The MMNC considers the assertion of this signal as another packet bus request by the UNI. It will |

| MMN-Bus Signal | MMN-Bus Signal Lines<br>Definition |
|---|---|
| | be serviced when all outstanding requests are complete. |
| More_Granted | 1 bit. More_Granted (MG) is asserted in response to MR* if no additional packet but requests are pending. This informs the requesting UNI that it will be granted immediate access to the bus for the next packet transfer. However, if additional requests are pending in the MMNC, the MG line will not be asserted. The requesting UNI will relinquish control of the bus when the current packet is complete. The request for additional packet access will be serviced when the request queue is empty. The UNI must watch the PMA for it's address. |
| Suspend | 1 bit. Suspend (SUS) is asserted by the MMNC during a packet transfer if the master cycle period is about to expire. The transmitting packet will stop sending data 2 cycles after the assertion SUS. The packet transfer will resume after the isochronous channel transfers are complete. The packet will resume the packet transfer at the point of the suspend. The destination UNI(s) must be prepared to resume the transfer also. The destination address portion of the transfer is not repeated during the resume. |
| Clock | 1 bit. The Clock is a central clock source for the MMNC and the UNI modules. For a FDDI-II BNI module, the MMN-Bus Clock is 12.5 Mhz. |

We claim:

1. A multimedia protocol for transmitting a first and second type of information from a network, over a network bus having a network interface to a plurality of user interfaces, said protocol comprising the steps of:
   generating a cyclically reoccurring master cycle having a first cycle:
   a. transmitting a start cycle signal indicating the start of first said cycle;
   b. transmitting a plurality of control blocks;
   c. transmitting a first-type-count signal prior to the start of each transmission of a first type of information, said first-type-count signal indicating the start of the transmission of said first type of information;
   d. sending one or more transmissions of said first type of information;
   e. transmitting a start-second-type signal, said start-second-type signal indicating the start of one or more transmission of a second type of information; and
   f. sending one or more transmission of said second type of information over said bus.

2. A method as in claim 1 wherein said control blocks comprise a first type and a second type, said first type of control block being associated with transmissions from said controller to said plurality of user interfaces and said second type of control block being associated with transmissions from said plurality of user interfaces to said controller.

3. A method as in claim 2 wherein each of said plurality of user interfaces has an associated control block of said first type and an associated control block and said second type, and all of said associated control blocks of said first type are transmitted prior to transmitting all of said associated control blocks of said second type.

4. A method as in claim 1 wherein said first-type-count signal indicates the number of said transmissions of said first type which will follow.

5. A method as in claim 4 wherein an end-first-type signal is transmitted after each of said transmisssions of said first type, said end-first-type signal indicating that all of said transmissions of said first type have been transmitted.

6. A method as in claim 1 wherein an address signal indicating destination is transmitted during the entire time said second type of information is transmitted.

7. A method as in claim 1 wherein said second type of information contains an indicator of the destination of said second type of information.

8. A method as in claim 7 wherein an end-second-type signal is transmitted after said transmissions of said second type of information, said end-second-type signal indicating that all of said transmissions of said second type have been transmitted.

9. A method including the steps of claim 8 wherein each transmission of the second type of information is followed by the end-second-type signal indicating the end of the second type of information and a transmission may include one or more transmissions of the second type of information.

10. A method as in claim 9 including generating a second cycle of said cyclically reoccuring master cycle, said second cycle being subsequent in time to said first cycle, and if one of said transmissions of said second type of information cannot be completed within said first cycle, a suspend signal is transmitted, said transmission continuing through the transmission of second cycle until said start-second-type signal is transmitted whereupon said uncompleted transmission of said second type of information is resumed.

11. A multimedia protocol for transmitting a first and second type of information from a network, over a network bus having a bus controller, to a plurality of user interfaces, said protocol comprising the steps of:
  generating a cyclically reoccurring master cycle having a first cycle:
    transmitting a start cycle signal indicating the start of said first cycle;
  b. transmitting a plurality of control blocks, wherein said control blocks comprise a first type and a second type, said first type of control block being associated with transmissions from said controller to said plurality of user interfaces and said second type of control block being associated with transmissions from said plurality of user interfaces to said controller, and each of said plurality of user interfaces has an associated control block of said first type and an associated control block of said second type, and all of said associated control blocks of said first type are transmitted prior to transmitting all of said control blocks of said second type;
  c. transmitting a first-type-count signal prior to the start of each transmission of a first type of information, said first-type-count signal indicating the start of the transmission of said first type of information;
  d. sending one or more transmissions of said first type of information;
  e. transmitting an end-first-type signal is transmitted after each of said transmissions of said first type, said end-first-type signal indicating that all of said transmissions of said first type have been transmitted;
  f. transmitting a start-second-type signal, said start-second-type signal indicating the start of one or more transmissions of a second type of information; and
  g. sending one or more transmissions of said second type of information over said bus;
  transmitting an end-second-type signal after said transmissions of said second type of information, said end-second-type signal indicating that all of said transmissions of said second type have been transmitted;
  i. transmitting one or more transmissions of said second type of information and an associated end-second-type signal after said end-second-type signal;
  j. generating a second cycle of said cyclically reoccurring master cycle, said second cycle being subsequent in time to said first cycle, and if one of said transmissions of said second type of information cannot be completed within said first cycle, transmitting a suspend signal, said transmission continuing through the transmission of said second cycle until said start-second-type signal is transmitted whereupon said uncompleted transmission of said second type of information is resumed.

12. A method as in claim 11 wherein an address signal indicating destination is transmitted during the entire time said second type of information is transmitted.

13. A multimedia system for transmitting a first and second type of information from a network, over a network bus having a bus controller, to a plurality of user interfaces, comprising:
  means for generating a cyclically reoccurring master cycle having a first cycle and a second cycle, said second cycle being subsequent in time to said first cycle;
  means for transmitting a start cycle signal indicating the start of said master cycle;
  means for transmitting a plurality of control blocks, wherein said control blocks comprise a first type and a second type, said first type of control block being associated with transmissions from said controller to said plurality of user interfaces and said second type of control block being associated with transmissions from said plurality of user interfaces to said controller, and each of said plurality of user interfaces has an associated control block of said first type and an associated control block of said second type, and all of said associated control blocks of said first type are transmitted prior to transmitting all of said control blocks of said second type;
  means for transmitting a first-type-count signal prior to the start of each transmissions of a first type of information said first-type-count signal indicating the start of the transmission of said first type of information;
  means for sending one or more transmissions of said first type of information;
  means for transmitting an end-first-type signal after each of said transmissions of said first type, said end-first-type signal indicating that all of said transmissions of said first type have been transmitted;

means for transmitting a start-second-type signal, said start-second-type signal indicating the start of one or more transmissions of a second type of information;

means for sending one or more transmissions of said second type of information over said bus;

means for transmitting an end-second-type signal after said transmissions of said second type of information, said end-first-type signal indicating that all of said transmissions of said first type have been transmitted;

means for transmitting a suspend signal if one of said transmissions of said second type of information cannot be completed within said first cycle, said suspend signal transmission continuing through the transmission of said second master cycle until said start-second-type signal is transmitted whereupon said uncompleted transmission of said second type of information is resumed.

14. A multi-media system as in claim 13 further comprising a means for transmitting an address signal indicating destination during the entire time said second type of information is transmitted.

* * * * *